(12) United States Patent
Sohma

(10) Patent No.: US 7,876,073 B2
(45) Date of Patent: Jan. 25, 2011

(54) SWITCHING REGULATOR WITH SLOPE COMPENSATION AND CONTROL METHOD THEREFOR

(75) Inventor: Shohtaroh Sohma, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 375 days.

(21) Appl. No.: 12/003,458

(22) Filed: Dec. 26, 2007

(65) Prior Publication Data

US 2008/0150508 A1 Jun. 26, 2008

(30) Foreign Application Priority Data

Dec. 26, 2006 (JP) ............................. 2006-349020

(51) Int. Cl.
G05F 1/56 (2006.01)
(52) U.S. Cl. ..................... 323/222; 323/283; 323/299
(58) Field of Classification Search .............. 323/222, 323/282, 283, 284, 285, 288, 299
See application file for complete search history.

(56) References Cited

U.S. PATENT DOCUMENTS 6,522,116 B1 * 2/2003 Jordan ..................... 323/288
7,425,819 B2 * 9/2008 Isobe ....................... 323/222

FOREIGN PATENT DOCUMENTS

JP 2005-229744 8/2005
JP 2006-033958 2/2006

* cited by examiner

*Primary Examiner*—Jeffrey L Sterrett
(74) *Attorney, Agent, or Firm*—Dickstein Shapiro LLP

(57) ABSTRACT

A current-mode controlled switching regulator and control method therefor. The switching regulator includes input and output terminals, a switching device to switch in accordance with a control signal, an inductor to store charge from an input voltage at the input terminal based on the switching device, a rectifying device to discharge the charge stored in the inductor, an error amplifier to amplify a voltage difference between a divided voltage generated by dividing an output voltage at the output terminal and a predetermined reference voltage, a slope voltage generator to generate and output a slope voltage having a slope angle corresponding to the input voltage, and a switching controller to compare a voltage output from the error amplifier with the slope voltage, generate a pulse signal with a duty cycle corresponding to a comparison result, and control the switching of the switching device according to the pulse signal.

18 Claims, 5 Drawing Sheets

US 7,876,073 B2

SWITCHING REGULATOR WITH SLOPE COMPENSATION AND CONTROL METHOD THEREFOR

CROSS-REFERENCE TO RELATED APPLICATION

This patent specification is based on and claims priority from Japanese Patent Application No. 2006-349020 filed on Dec. 26, 2006 in the Japan Patent Office, the entire contents of which are hereby incorporated by reference herein.

BACKGROUND

1. Field of the Invention

The present invention relates to a current-mode controlled switching regulator and a control method therefor.

2. Description of the Related Art

Until recently, a switching regulator has generally employed a voltage-mode control system, in which a switching device is controlled by PWM (pulse width modulation) control based on the voltage difference between an output voltage and a reference voltage to stabilize the output voltage. However, since such a voltage-mode controlled switching regulator detects a feedback signal from the output voltage, response to fluctuation in the output voltage is slow. Further, phase compensation for an error amplifier that amplifies the voltage difference between the output voltage and the reference voltage becomes complicated.

To overcome these drawbacks, a current-mode controlled switching regulator is increasingly used. However, it is known that subharmonic oscillation may occur using the current-mode controlled switching regulator and the current-mode controlled switching regulator may become uncontrollable when a pulse width modulated signal has a duty cycle of more than 50%. The subharmonic oscillation is generally avoided by adding slope compensation to the PWM control.

FIG. 1 is a diagram illustrating example circuitry of a current-mode controlled switching regulator with a slope compensation circuit, which is a step-down switching regulator having an input terminal IN to which an input voltage $V_{in}$ is applied and an output terminal OUT from which an output voltage $V_{out}$ is output.

In FIG. 1, when a switching transistor 105 is turned on, power is supplied to an inductor 104, a smoothing capacitor 102, and a load 101. When the switching transistor 105 is turned off, the energy stored in the inductor 104 and the smoothing capacitor 102 is supplied to the load 101. A current-to-voltage converter 106 has an impedance $R_{sense}$ for converting a current iL flowing through the inductor 104 into a converted voltage $V_{sense}$, or $R_{sense} \times iL$.

An oscillator 110 generates and outputs a reference clock signal CLK and a sawtooth voltage signal $V_{ramp}$. An adder 108 adds the sawtooth voltage signal $V_{ramp}$ to the converted voltage $V_{sense}$ for slope compensation and outputs a slope voltage $V_s$ to a non-inverted input terminal of a PWM comparator 107. An error amplifier 115 amplifies the voltage difference between a divided voltage $V_{fb}$ generated by dividing the output voltage $V_{out}$ and a reference voltage $V_{ref}$ and generates and outputs an error voltage $V_e$ to an inverted input terminal of the PWM comparator 107. The PWM comparator 107 compares the error voltage $V_e$ with the slope voltage $V_s$. When the error voltage $V_e$ exceeds the slope voltage $V_s$, the PWM comparator 107 resets an RS latch circuit 112 and turns off the switching transistor 105. Accordingly, the peak current value of the inductor current iL depends on the error voltage $V_e$.

The output voltage $V_{out}$ is controlled as follows. When the divided voltage $V_{fb}$ is higher than the reference voltage $V_{ref}$, the error voltage $V_e$ is lowered to lower the output voltage $V_{out}$. When the divided voltage $V_{fb}$ is lower than the reference voltage $V_{ref}$, the error voltage $V_e$ is increased to increase the output voltage $V_{out}$.

To avoid subharmonic oscillation by slope compensation, it is desirable that the slope angle of the slope voltage $V_s$ be not less than half the slope angle of the inductor current iL flowing when the switching transistor 105 is off.

Specifically, the slope diL/dt of the inductor current iL flowing in the current-mode controlled switching regulator of FIG. 1 is expressed by the following formula (a) when the switching transistor 105 is on, and expressed by the following formula (b) when the switching transistor 105 is off:

$$diL/dt = (V_{in} - V_{out})/L \qquad (a)$$

$$diL/dt = -V_{out}/L \qquad (b),$$

where L is the inductance of the inductor 104.

The slope angle of the sawtooth voltage signal $V_{ramp}$, which is referred to as a slope compensation value $I_{ramp}$, is expressed by the following formula (c):

$$I_{ramp} > V_{out}/2/L \times R_{sense} \qquad (c)$$

The following formulas (d), (e), and (f) can be provided for a step-up switching regulator, corresponding to the formulas (a), (b), and (c), respectively.

$$diL/dt = V_{in}/L \qquad (d)$$

$$diL/dt = -(V_{out} - V_{in})/L \qquad (e)$$

$$I_{ramp} > (V_{out} - V_{in})/L/2 \times R_{sense} \qquad (f)$$

The slope compensation value $I_{ramp}$ is expressed by using the input voltage $V_{in}$ and the output voltage $V_{out}$ without problem when the input voltage $V_{in}$ and the output voltage $V_{out}$ are fixed. However, the input voltage $V_{in}$ and the output voltage $V_{out}$ generally fluctuate in a wide range. When the slope compensation value $I_{ramp}$ is fixed, it is necessary that the slope compensation value $I_{ramp}$ is set to be a value that is a maximum value in the estimated fluctuation range of the input voltage $V_{in}$ and the output voltage $V_{out}$. By performing excessive slope compensation like this case, subharmonic oscillation can be avoided. However, the effect of current feedback decreases and the operation becomes similar to the operation of the voltage-mode control system. Consequently, controllability decreases. Therefore, to perform adequate slope compensation in a wide input/output voltage range, the amount of slope compensation is determined based on input and output voltage levels.

However, in this case, since the amount of slope compensation is changed according to the input and output voltages, the circuitry is complicated. In addition, a general-purpose IC for a switching regulator generally uses an external resistor to generate a divided voltage by dividing the output voltage, which may prevent monitoring of the output voltage and thereby prevent slope compensation in accordance with the output voltage.

SUMMARY

This patent specification describes a novel current-mode controlled step-down switching regulator that includes an input terminal, an output terminal, a switching device to switch in accordance with a control signal, an inductor to store charge from an input voltage at the input terminal based on the switching device, a rectifying device to discharge the charge stored in the inductor, an error amplifier to amplify a voltage difference between a divided voltage generated by dividing an output voltage at the output terminal and a predetermined reference voltage, a slope voltage generator to generate and output a slope voltage having a slope angle corresponding to the input voltage, and a switching controller to compare a voltage output from the error amplifier with the slope voltage, generate a pulse signal with a duty cycle corresponding to a comparison result, and control the switching of the switching device according to the pulse signal.

This patent specification further describes a novel current-mode controlled step-up switching regulator that includes an input terminal, an output terminal, a switching device to switch in accordance with a control signal, an inductor to store charge from an input voltage at the input terminal based on the switching device, a rectifying device to discharge the charge stored in the inductor, an error amplifier to amplify a voltage difference between a divided voltage generated by dividing an output voltage at the output terminal and a predetermined reference voltage, a slope voltage generator to generate and output a slope voltage having a slope angle corresponding to the output voltage, and a switching controller to compare a voltage output from the error amplifier with the slope voltage, generate a pulse signal with a duty cycle corresponding to a comparison result, and control the switching of the switching device according to the pulse signal.

In addition, this patent specification describes a novel control method for controlling the current-mode controlled step-down switching regulator including generating a slope voltage and changing a slope angle of the slope voltage according to the input voltage to generate a pulse signal for controlling the switching of the switching device.

This patent specification further describes a novel control method for controlling the current-mode controlled step-up switching regulator including generating a slope voltage and changing a slope angle of the slope voltage according to the output voltage to generate a pulse signal for controlling the switching of the switching device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
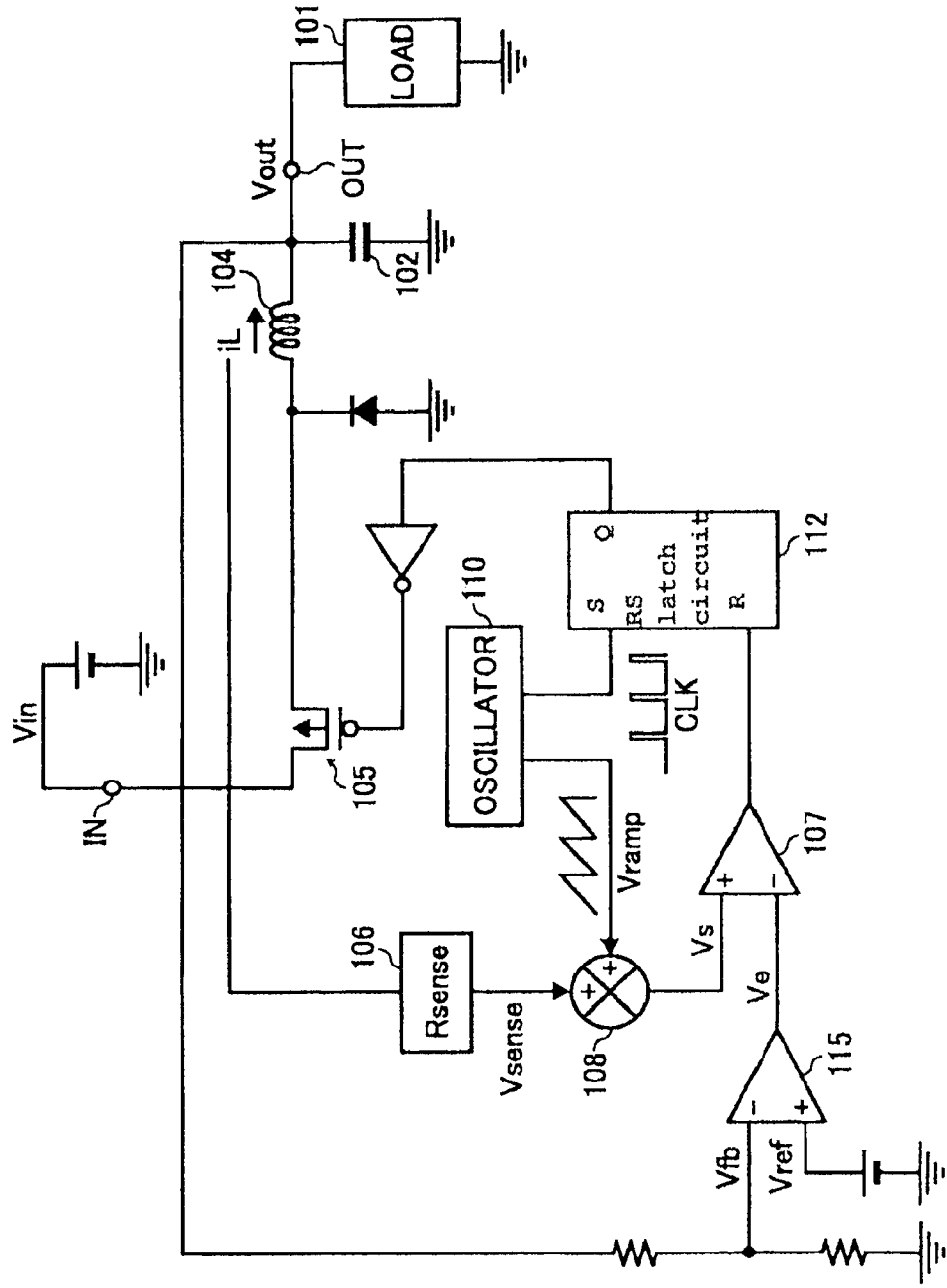
FIG. 1 is a diagram illustrating example circuitry of a background current-mode controlled switching regulator.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 2:
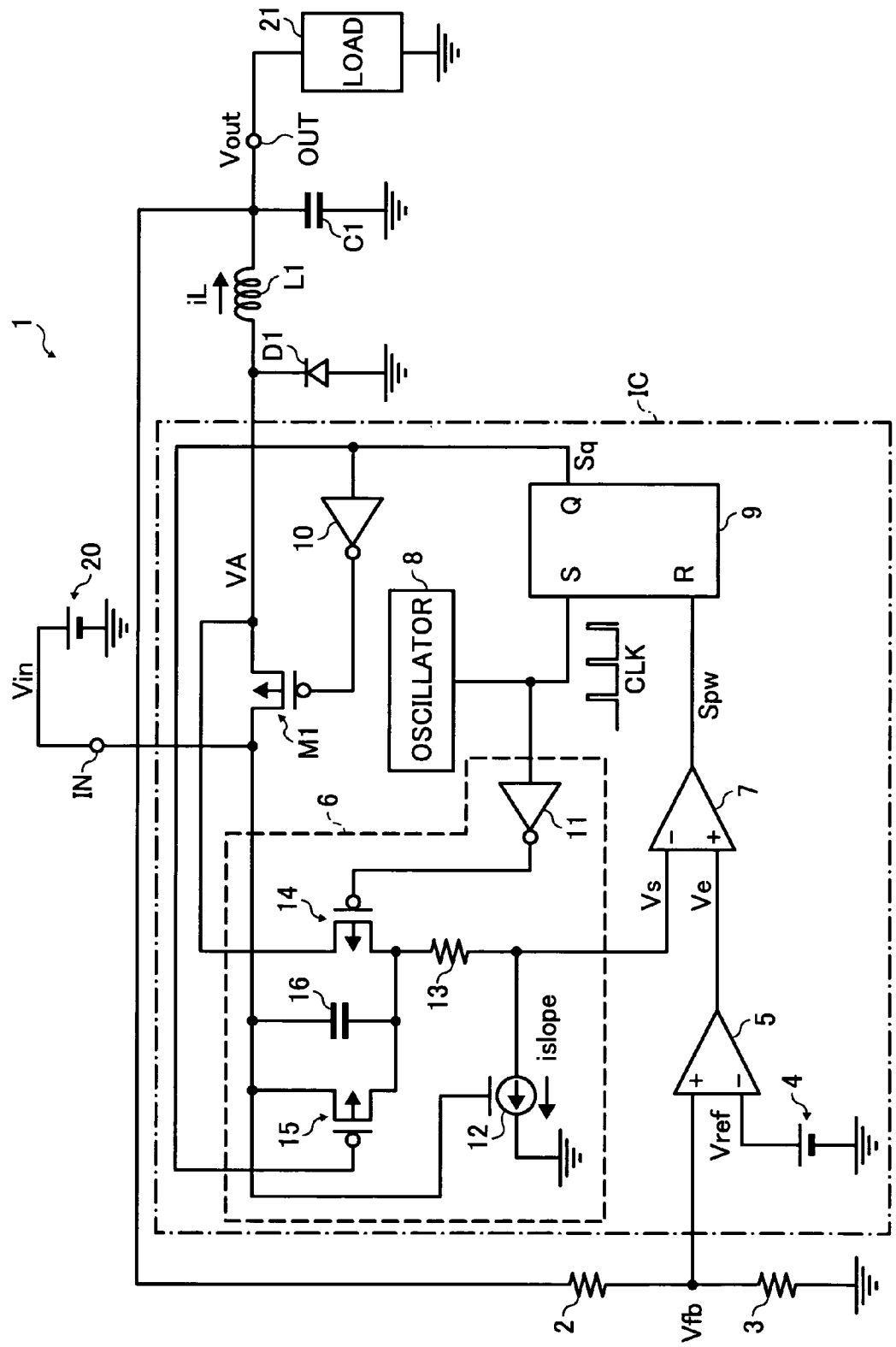
FIG. 2 is a diagram illustrating example circuitry of a current-mode controlled switching regulator according to a first embodiment of the present invention.

Referring now to the drawings, wherein like reference numerals designate identical or corresponding parts throughout the several views thereof, and in the first instance to FIG. 2, current-mode controlled switching regulators according to exemplary embodiments of the present invention are described.

FIG. 2 is a diagram illustrating example circuitry of a current-mode controlled switching regulator according to a first embodiment.

A current-mode controlled switching regulator (hereinafter referred to as a switching regulator) 1 of FIG. 2 forms a step-down switching regulator that converts an input voltage $V_{in}$ applied from a DC (direct current) power supply 20 to an input terminal IN into a lower voltage than the input voltage $V_{in}$ and outputs an output voltage $V_{out}$ from an output terminal OUT to a load 21.

The switching regulator 1 includes a PMOS switching transistor M1 that controls output of a current flowing from the input terminal IN, a rectifying diode D1, an inductor L1, a smoothing capacitor C1, and output voltage detecting resistors 2 and 3 that divide the output voltage $V_{out}$ output from the output terminal OUT, and generate and output a divided voltage $V_{fb}$.

The switching regulator 1 also includes a reference voltage generator 4 that generates and outputs a reference voltage $V_{ref}$, an error amplifier 5 that compares the divided voltage $V_{fb}$ with the reference voltage $V_{ref}$, amplifies the resulting voltage difference therebetween, and generates and outputs an error voltage $V_e$, and a slope voltage generator 6 that generates and outputs a slope voltage $V_s$.

The switching regulator 1 further includes a PWM comparator 7 that compares the error voltage $V_e$ from the error amplifier 5 with the slope voltage $V_s$ and generates and outputs a pulse signal Spw having a pulse width corresponding to the error voltage $V_e$ to perform PWM control, an oscillator 8 that generates and outputs a clock signal CLK, a Reset-Set (RS) flip-flop circuit 9 having a set input terminal S that receives the clock signal CLK from the oscillator 8, a reset input terminal R that receives the pulse signal Spw from the PWM comparator 7, and an output terminal Q that outputs an output signal Sq, and an inverter 10 that generates a control signal to control switching of the switching transistor M1 by driving the switching transistor M1 according to the output signal Sq from the RS flip-flop circuit 9.

The slope voltage generator 6 includes an inverter 11, a voltage-to-current converter 12, a resistor 13, PMOS transistors 14 and 15, and a capacitor 16. The switching transistor M1 forms a switching device. The diode D1 forms a rectifying device. The resistors 2 and 3, the reference voltage generator 4, and the error amplifier 5 form an error amplifier. The slope voltage generator 6 forms a slope voltage generator. The PWM comparator 7, the oscillator 8, the RS flip-flop circuit 9, and the inverter 10 form a switching controller. The PWM comparator 7 forms a voltage comparator. The RS flip-flop circuit 9 forms a control circuit. The voltage-to-current converter 12 forms a current source. The PMOS transistor 14 forms a voltage supplier. The PMOS transistor 15 forms a discharge circuit. Each circuit included in the switching regulator 1 of FIG. 2, excluding the inductor L1, the diode D1, the capacitor C1, and the resistors 2 and 3, is integrated on an integrated circuit (IC).

The switching transistor M1 is connected between the input voltage $V_{in}$ and the cathode of the diode D1. The anode of the diode D1 is connected to ground. The inductor L1 is connected between the drain of the switching transistor M1 and the output terminal OUT. The resistors 2 and 3, which are connected in series, and the capacitor C1 are connected in parallel between the output terminal OUT and ground. In the error amplifier 5, the divided voltage $V_{fb}$, which is the voltage at the connection node of the resistors 2 and 3, is applied to the non-inverted input terminal and the reference voltage $V_{ref}$ is applied to the inverted input terminal. In the PWM comparator 7, the error voltage $V_e$ from the error amplifier 5 is applied to the non-inverted input terminal and the slope voltage $V_s$ is applied to the inverted input terminal. The output signal Sq from the RS flip-flop circuit 9 is inverted by the inverter 10 and the inverted signal is input to the gate of the switching transistor M1.

In the slope voltage generator 6, the PMOS transistor 14 and the resistor 13 are connected in series between the drain of the switching transistor M1 and the inverted input terminal of the PWM comparator 7. The voltage-to-current converter 12 is connected between the inverted input terminal of the PWM comparator 7 and ground. In the voltage-to-current converter 12, the input voltage $V_{in}$ is applied to an input terminal that receives a control signal. The voltage-to-current converter 12 allows a current $i_{slope}$ corresponding to the input voltage $V_{in}$ to flow from the resistor 13 to ground. The connection node of the resistor 13 and the voltage-to-current converter 12 forms the output terminal of the slope voltage generator 6 and the slope voltage $V_s$ is output therefrom. The inverter 11 inverts the clock signal CLK and outputs the inverted clock signal to the gate of the PMOS transistor 14. The PMOS transistor 15 and the capacitor 16 are connected in parallel between the input terminal IN and the drain of the PMOS transistor 14. The output signal Sq from the RS flip-flop circuit 9 is input to the gate of the PMOS transistor 15.

In the above-described configuration, when the error voltage $V_e$ is lower than the slope voltage $V_s$, the PWM comparator 7 outputs a low level signal, the RS flip-flop circuit 9 outputs a high level signal while the clock signal CLK is high, and the inverter 10 turns the switching transistor M1 on for conduction. When the switching transistor M1 is on, power is supplied to the inductor L1, the smoothing capacitor C1, and the load 21. When the switching transistor M1 is off, the energy stored in the inductor L1 and the smoothing capacitor C1 is supplied to the load 21.

The error amplifier 5 amplifies the voltage difference between the divided voltage $V_{fb}$ generated by dividing the output voltage $V_{out}$ and the reference voltage $V_{ref}$ to generate and output the error voltage $V_e$ to the non-inverted input terminal of the PWM comparator 7. The PWM comparator 7 compares the error voltage $V_e$ with the slope voltage $V_s$ from the slope voltage generator 6. When the error voltage $V_e$ is higher than the slope voltage $V_s$, the PWM comparator 7 resets the RS flip-flop circuit 9 to turn off the switching transistor M1. Accordingly, the peak current value of an inductor current iL flowing through the inductor L1 depends on the error voltage $V_e$.

The output voltage $V_{out}$ is controlled as follows. When the divided voltage $V_{fb}$ is higher than the reference voltage $V_{ref}$ the output voltage $V_{out}$ is lowered by increasing the error voltage $V_e$. When the divided voltage $V_{fb}$ is lower than the reference voltage $V_{ref}$ the output voltage $V_{out}$ is increased by lowering the error voltage $V_e$.

Figure 3:
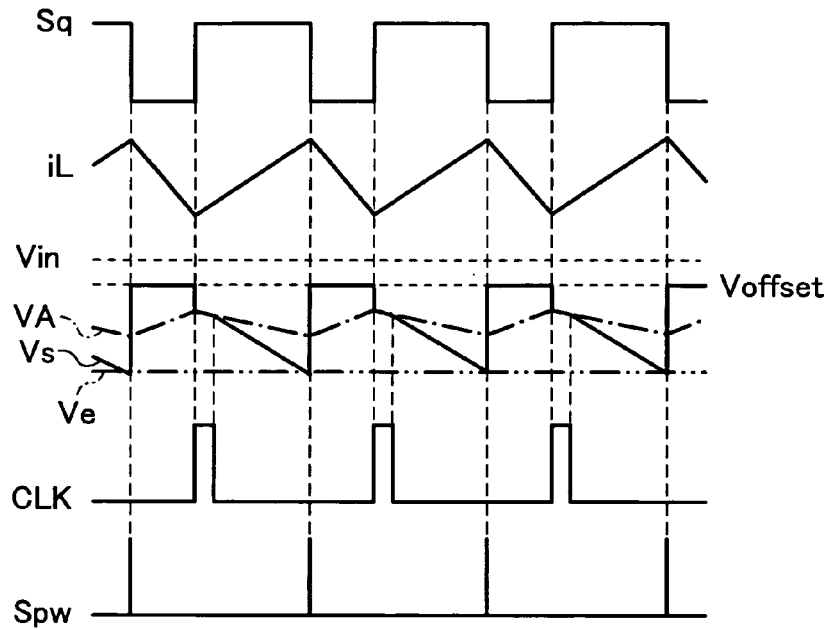
FIG. 3 is a timing chart illustrating example waveforms in the current-mode controlled switching regulator of FIG. 2.

FIG. 3 is a timing chart illustrating example waveforms in the switching regulator 1 of FIG. 2. Operation of the slope voltage generator 6 of FIG. 2 is described referring to FIG. 3.

The voltage-to-current converter 12 generates and outputs the current $i_{slope}$ corresponding to the input voltage $V_{in}$. The current $i_{slope}$ is expressed by $A \times V_{in}$, where A is a given value. An offset voltage $V_{offset}$ added to the input voltage $V_{in}$ by the resistor 13 is expressed by the following formula (1):

$$V_{offset} = V_{in} - i_{slope} \times R_{offset} \qquad (1),$$

where $R_{offset}$ is the resistance value of the resistor 13.

The input voltage $V_{in}$ is applied to one end of the capacitor 16. When the clock signal CLK is high and the PMOS transistor 14 is on, a drain voltage VA of the switching transistor M1 is applied to the other end of the capacitor 16 through the PMOS transistor 14. As a result, a voltage difference is generated across the capacitor 16, thereby charging the capacitor 16. When the switching transistor M1 is on, the drain voltage VA of the switching transistor M1 is equal to $V_{in} - R_{on} \times iL_{valley}$, where $R_{on}$ is the on-resistance of the switching transistor M1, and $iL_{valley}$ is the current value of the inductor current iL while the switching transistor M1 is on.

When the PMOS transistor 14 is off, the charge stored in the capacitor 16 is discharged by the voltage-to-current converter 12. The slope angle of the voltage of the capacitor 16 becomes $-A \times V_{in}/Cvs$, where Cvs is the capacitance of the capacitor 16.

Therefore, when the switching transistor M1 is on, the slope voltage $V_s$ is expressed by the following formula (2):

$$V_s = V_{in} - A \times V_{in} \times R_{offset} - R_{on} \times iL_{valley} - A \times V_{in}/Cvs \times t \qquad (2),$$

where t is the time elapsed since the switching transistor M1 is turned on.

$$\text{When } A/Cvs = R_{on}/L \qquad (3),$$

where L is the inductance of the inductor L1, the following formula (4) is obtained from the formula (2):

$$dV_s/dt = -R_{on} \times V_{in}/L \qquad (4)$$

When the output signal Sq from the RS flip-flop circuit 9 is low, the switching transistor M1 is off and the PMOS transistor 15 is on, thereby discharging the charge stored in the capacitor 16, and the capacitor 16 is reset.

While the formula (3) is obtained by assuming that the on-resistance $R_{on}$ is a constant value, and the current $i_{slope}$ generated by the voltage-to-current converter 12 that forms a current source is expressed by $A \times V_{in}$, the on-resistance $R_{on}$ generally fluctuates with respect to the temperature of the switching transistor M1 and the gate voltage thereof during the on state.

Considering the fluctuation in the on-resistance $R_{on}$, the following formula (5) is obtained from the formula (2) by expressing the current $i_{slope}$ by $B \times R_{on} \times V_{in}$, where B is a given value:

$$V_s = V_{in} - B \times R_{on} \times V_{in} \times R_{offset} - R_{on} \times iL_{valley} - B \times R_{on} \times V_{in}/Cvs \times t \qquad (5)$$

$$\text{When } B/Cvs = 1/L \qquad (6),$$

the following formula (7) is obtained from the formula (5):

$$dV_s/dt = -R_{on} \times V_{in}/L \qquad (7)$$

As can be seen from the formula (7), the slope angle $dV_s/dt$ of the slope voltage $V_s$ fluctuates in accordance with fluctuation of the input voltage $V_{in}$. Therefore, the slope voltage generator 6 increases the slope angle of the slope voltage $V_s$ to have a larger slope angle than a slope angle of half the inductor current iL in a shut-down state in which the switching transistor M1 is turned off.

Figure 4:
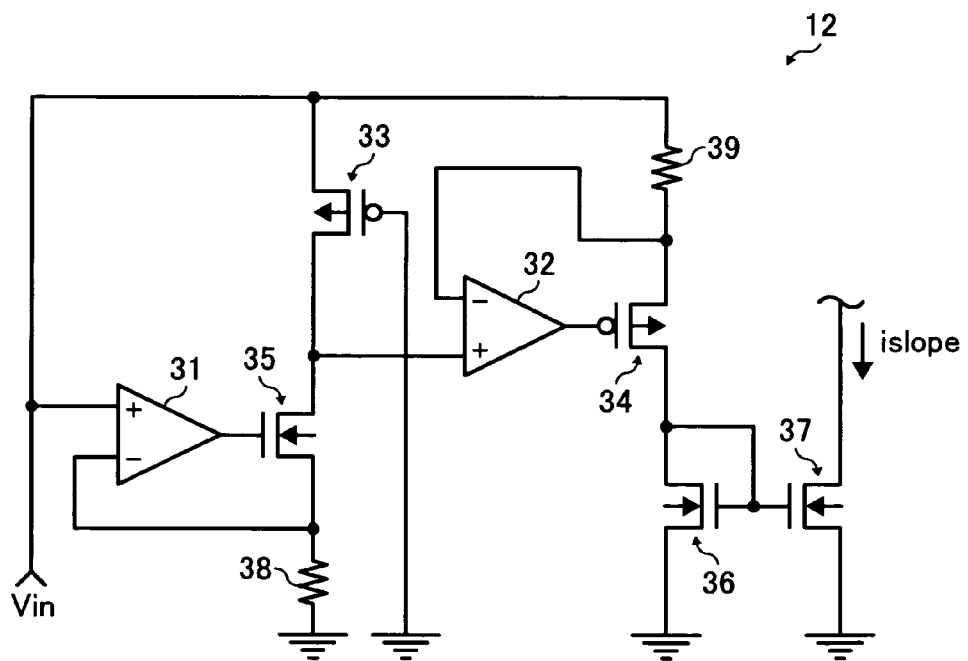
FIG. 4 is a diagram illustrating example circuitry of a voltage-to-current converter of FIG. 2.

FIG. 4 is a diagram illustrating example circuitry of the voltage-to-current converter 12.

In FIG. 4, the voltage-to-current converter 12 forms a current source that generates the current $i_{slope}$ corresponding to the input voltage $V_{in}$ and includes error amplifiers 31 and 32, PMOS transistors 33 and 34, NMOS transistors 35, 36, and 37, and resistors 38 and 39.

The PMOS transistor 33, the NMOS transistor 35, and the resistor 38 are connected in series between the input voltage $V_{in}$ and ground. The gate of the PMOS transistor 33 is connected to ground and the gate of the NMOS transistor 35 is connected to the output terminal of the error amplifier 31. In the error amplifier 31, the input voltage $V_{in}$ is applied to the non-inverted input terminal and the inverted input terminal is connected to the connection node of the NMOS transistor 35 and the resistor 38.

The resistor 39, the PMOS transistor 34, and the NMOS transistor 36 are connected in series between the input voltage $V_{in}$ and ground. The gate of the PMOS transistor 34 is connected to the output terminal of the error amplifier 32. In the error amplifier 32, the non-inverted input terminal is connected to the connection node of the PMOS transistor 33 and the NMOS transistor 35 and the inverted input terminal is connected to the connection node of the resistor 39 and the PMOS transistor 34. The NMOS transistors 36 and 37 form a current mirror circuit. The gates of the NMOS transistors 36 and 37 are connected to each other and the connection node thereof is connected to the drain of the NMOS transistor 36. The sources of the NMOS transistors 36 and 37 are connected to ground and the current $i_{slope}$ flows from the drain of the NMOS transistor 37 to ground.

The error amplifier 31 controls the current flowing through the NMOS transistor 35 by controlling the NMOS transistor 35 so that the voltage applied to its inverted input terminal becomes equal to the input voltage $V_{in}$, which is applied to its non-inverted input terminal. The resistors 38 and 39 have resistance values R38 and R39, respectively, neither of which fluctuates. In this example embodiment, the PMOS transistor 33 is formed by the same process as the switching transistor M1. A voltage that turns the switching transistor M1 on is applied to the gate of the PMOS transistor 33. The PMOS transistor 33 has the size of 1/n of the switching transistor M1 and the on-resistance of n×$R_{on}$.

The current of $V_{in}$/R38 flows through the resistor 38 and the PMOS transistor 33. Therefore, the voltage difference across the PMOS transistor 33 is equal to n×$R_{on}$×($V_{in}$/R38). The error amplifier 32 controls the PMOS transistor 34 so that the voltage difference across the resistor 39 becomes equal to n×$R_{on}$×($V_{in}$/R38). Therefore, the current of $R_{on}$×n×$V_{in}$/R38/R39 flows through the resistor 39. The drain current of the NMOS transistor 37 that forms the current mirror circuit is equal to $R_{on}$×n×$V_{in}$/R38/R39. The current $i_{slope}$ is expressed by the following formula (8):

$$i_{slope} = B \times R_{on} \times V_{in} \qquad (8),$$

where B=n/R38/R39.

It should be noted that although the on-resistance of the switching transistor M1 is used to convert a current into a voltage when the switching transistor M1 is on in the above-described example circuit, alternatively, a sense resistor that detects the output current of the switching transistor M1 may be connected in series to the inductor L1 to convert a current into a voltage when the switching transistor M1 is on. In this case, the PMOS transistor 33 in the voltage-to-current converter 12 of FIG. 4 may be replaced by a resistor having the same temperature characteristics as the sense resistor.

The current-mode controlled switching regulator according to the first embodiment provides an appropriate slope compensation in a wide input/output voltage range with simple circuitry by changing the slope angle of the slope voltage $V_s$ according to fluctuation in the input voltage $V_{in}$. As a result, subharmonic oscillation can be avoided.

It should be noted that although a step-down switching regulator is described as an example of the first embodiment, the present invention is not limited thereto but is also applicable to a step-up switching regulator, which is now described as a second embodiment.

Figure 5:
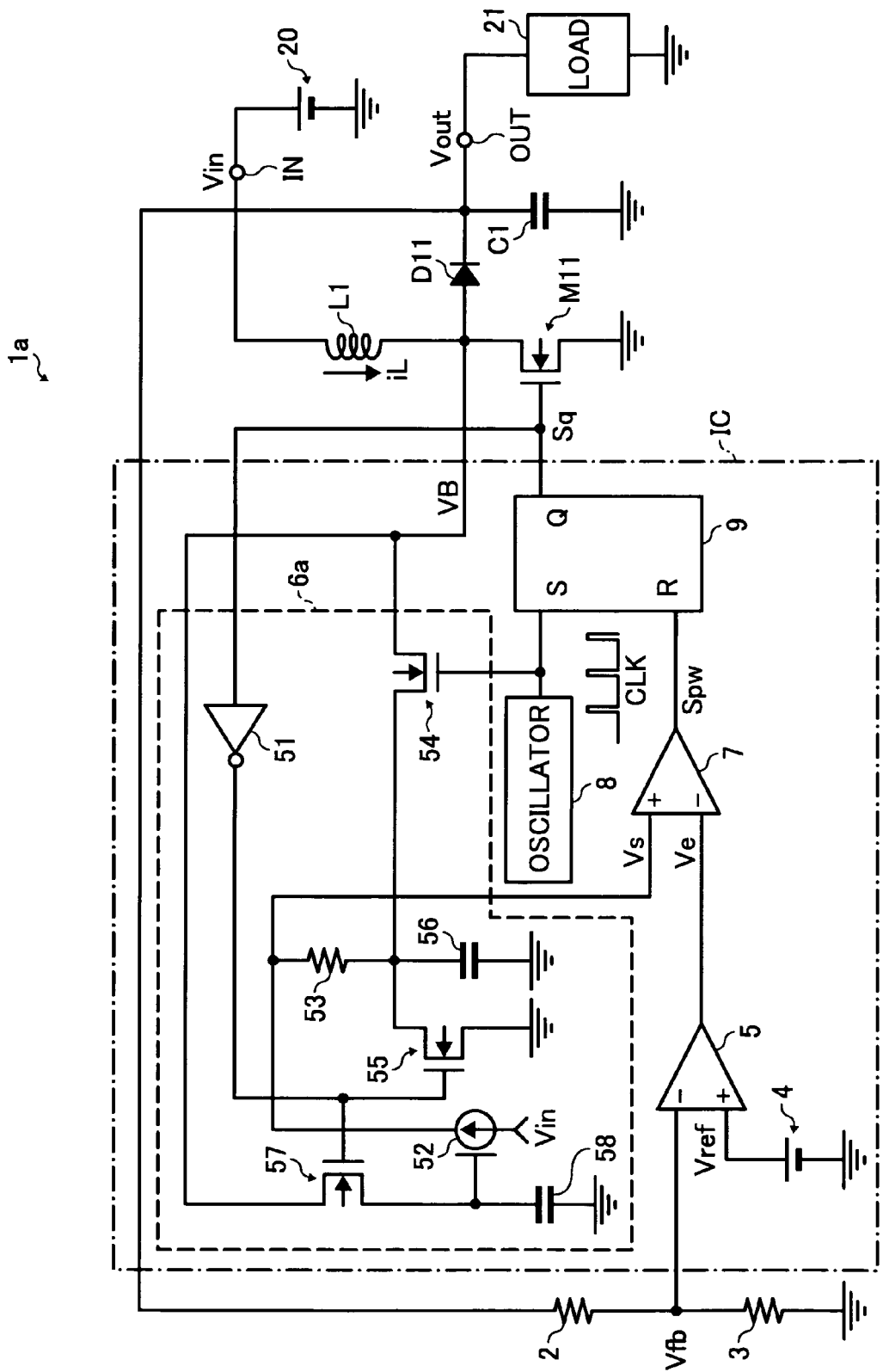
FIG. 5 is a diagram illustrating example circuitry of a current-mode controlled switching regulator according to a second embodiment of the present invention.

FIG. 5 is a diagram illustrating example circuitry of a current-mode controlled switching regulator according to the second embodiment. In FIG. 5, the same or similar components to those illustrated in FIG. 2 are referred to by the same reference numerals.

A switching regulator 1a of FIG. 5 forms a step-up switching regulator that converts an input voltage $V_{in}$ applied from a DC power supply 20 to an input terminal IN into a higher voltage than the input voltage $V_{in}$ and outputs an output voltage $V_{out}$ from an output terminal OUT to a load 21.

The switching regulator 1a includes a NMOS switching transistor M11, a rectifying diode D11, an inductor L1, a smoothing capacitor C1, and output voltage detecting resistors 2 and 3 that divide the output voltage $V_{out}$ output from the output terminal OUT and generate and output a divided voltage $V_{fb}$.

The switching regulator 1a also includes a reference voltage generator 4 that generates and outputs a reference voltage $V_{ref}$, an error amplifier 5 that compares the divided voltage $V_{fb}$ with the reference voltage $V_{ref}$, amplifies the resulting voltage difference therebetween, and generates and outputs an error voltage $V_e$, and a slope voltage generator 6a that generates and outputs a slope voltage $V_s$.

The switching regulator 1a further includes a PWM comparator 7 that compares the error voltage $V_e$ from the error amplifier 5 with the slope voltage $V_s$ and generates and outputs a pulse signal Spw having a pulse width corresponding to the error voltage $V_e$ to perform PWM control, an oscillator 8 that generates and outputs a clock signal CLK, an RS flip-flop circuit 9 having a set input terminal S that receives the clock signal CLK from the oscillator 8, a reset input terminal R that receives the pulse signal Spw from the PWM comparator 7, and an output terminal Q that outputs an output signal Sq.

The slope voltage generator 6a includes an inverter 51, a voltage-to-current converter 52, a resistor 53, NMOS transistors 54, 55 and 57, and capacitors 56 and 58. The switching transistor M11 forms a switching device. The diode D11 forms a rectifying device. The slope voltage generator 6a forms a slope voltage generator. The PWM comparator 7, the oscillator 8, and the RS flip-flop circuit 9 form a switching controller. The voltage-to-current converter 52 forms a current source. The NMOS transistor 54 forms a voltage supplier. The NMOS transistor 55 forms a discharge circuit. Each circuit included in the switching regulator 1a of FIG. 5, excluding the inductor L1, the diode D11, the capacitor C1, and the resistors 2 and 3, is integrated on an IC.

The inductor L1 is connected between the input voltage $V_{in}$ and the drain of the switching transistor M11. As for the diode D11, the anode is connected to the drain of the switching transistor M11 and the cathode is connected to the output terminal OUT. The resistors 2 and 3, which are connected in series, and the capacitor C1 are connected in parallel between the output terminal OUT and ground. In the error amplifier 5, the divided voltage $V_{fb}$, which is the voltage at the connection node of the resistors 2 and 3, is applied to the inverted input terminal and the reference voltage $V_{ref}$ is applied to the non-inverted input terminal. In the PWM comparator 7, the error voltage $V_e$ from the error amplifier 5 is applied to the inverted input terminal and the slope voltage $V_s$ is applied to the non-inverted input terminal. The output signal Sq from the RS flip-flop circuit 9 is input to the gate of the switching transistor M11. The output signal Sq is also input to the gates of the NMOS transistors 55 and 57 after being inverted by the inverter 51.

In the slope voltage generator 6a, the voltage-to-current converter 52, the resistor 53, and the capacitor 56 are connected in series between the input voltage $V_{in}$ and ground. The NMOS transistor 55 is connected parallel to the capacitor 56. The NMOS transistor 54 is connected between the connection node of the resistor 53 and the capacitor 56 and the drain of the switching transistor M11. The clock signal CLK is input to the gate of the NMOS transistor 54. The NMOS transistor 57 and the capacitor 58 are connected in series between the drain of the switching transistor M11 and ground. The voltage-to-current converter 52 includes an input terminal that receives a control signal and is connected to the connection node of the NMOS transistor 57 and the capacitor 58. The slope voltage $V_s$ is output from the connection node of the voltage-to-current converter 52 and the resistor 53 to the non-inverted input terminal of the PWM comparator 7.

In the above-described configuration, when the switching transistor M11 is on for conduction, power is supplied from the DC power supply 20 to the inductor L1. When the switching transistor M11 is off, the energy stored in the inductor L1 is added to the input voltage $V_{in}$ and output from the output terminal OUT. When the clock signal CLK is high, the RS flip-flop circuit 9 is set and outputs a high level output signal Sq to turn the switching transistor M11 on for conduction. The error amplifier 5 outputs the error voltage $V_e$ so that the divided voltage $V_{fb}$ is equal to the reference voltage $V_{ref}$. The PWM comparator 7 compares the slope voltage $V_s$ with the error voltage $V_e$. When the slope voltage $V_s$ is higher than the error voltage $V_e$, the PWM comparator 7 resets the RS flip-flop circuit 9 to turn the switching transistor M11 off.

Figure 6:
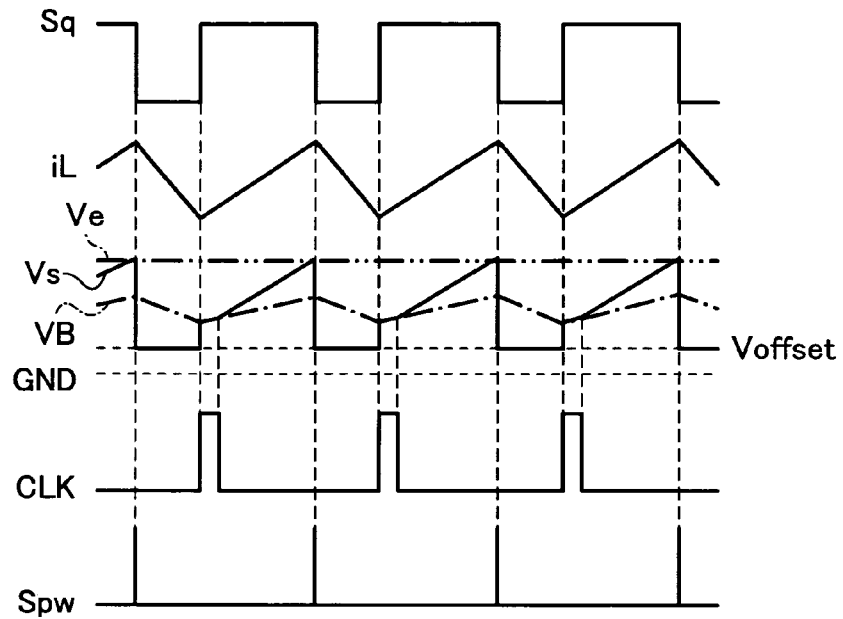
FIG. 6 is a timing chart illustrating example waveforms in the current-mode controlled switching regulator of FIG. 5.

FIG. 6 is a timing chart illustrating example waveforms in the switching regulator 1a of FIG. 5. Generation of the slope voltage $V_s$ by the slope voltage generator 6a is described referring to FIG. 6.

The voltage at the connection node of the NMOS transistor 57 and the capacitor 58 is equal to the output voltage $V_{out}$, and therefore the voltage-to-current converter 52 generates and outputs a current $i_{slope}$ corresponding to the output voltage $V_{out}$. The current $i_{slope}$ is expressed by $D \times V_{out}$, where D is a given value. An offset voltage $V_{offset}$ added by the resistor 53 to have an offset voltage to ground voltage GND and is expressed by the following formula (9):

$$V_{offset} = i_{slope} \times R_{offset} \tag{9}$$

where $R_{offset}$ is the resistance value of the resistor 53.

The output voltage $V_{out}$ is equal to a drain voltage VB of the switching transistor M11 when the switching transistor M11 is off. By turning the NMOS transistor 57 on when the switching transistor M11 is off, the voltage across the capacitor 58 is held at the output voltage $V_{out}$ and therefore $i_{slope} = D \times V_{out}$.

The NMOS transistor 54 performs sampling with the drain voltage VB of the switching transistor M11 across the capacitor 56 during when the clock signal CLK from the oscillator 8 is high. After the sampling, the drain voltage VB of the switching transistor M11 is equal to $R_{on} \times iL_{valley}$, where $R_{on}$ is the on-resistance of the switching transistor M11, and $iL_{valley}$ is the current value of an inductor current iL flowing through the inductor L1 while the switching transistor M11 is on.

When the NMOS transistor 54 is off, the capacitor 56 is charged by the voltage-to-current converter 52 that forms a current source. The slope angle of the voltage of the capacitor 56 is equal to $D \times V_{out}/Cvs$, where Cvs is the capacitance of the capacitor 56. Therefore, when the switching transistor M11 is on, the slope voltage $V_s$ is expressed by the following formula (10):

$$V_s = D \times V_{out} \times R_{offset} + R_{on} \times iL_{valley} + D \times V_{out}/Cvs \times t \tag{10}$$

where t is the time elapsed since the switching transistor M11 is turned on.

When $D/Cvs = R_{on}/L$ (11), where L is the inductance of the inductor L1, the following formula (12) is obtained from the formula (10):

$$dV_s/dt = R_{on} \times V_{out}/L \tag{12}$$

When the switching transistor M11 is off, the NMOS transistor 55 is on and the charge stored in the capacitor 56 is discharged, thereby resetting the voltage of the capacitor 56 to ground.

While the formula (11) is obtained by assuming that the on-resistance $R_{on}$ is a constant value, and the current $i_{slope}$ generated by the voltage-to-current converter 52 that forms a current source is expressed by $D \times V_{out}$, the on-resistance $R_{on}$ generally fluctuates with respect to the temperature of the switching transistor M11 and the gate voltage thereof during the on state.

Considering the fluctuation in the on-resistance $R_{on}$, the following formula (13) is obtained from the formula (10) by expressing the current $i_{slope}$ by $E \times R_{on} \times V_{out}$, where E is a given value:

$$V_s = E \times R_{on} \times V_{out} \times R_{offset} + R_{on} \times iL_{valley} + E \times R_{on} \times V_{out}/Cvs \times t \tag{13}$$

When $E/Cvs = 1/L$ (14), the following formula (15) is obtained from the formula (13):

$$dV_s/dt = R_{on} \times V_{out}/L \tag{15}$$

As can be seen from the formula (15), the slope angle $dV_s/dt$ of the slope voltage $V_s$ fluctuates in accordance with fluctuation of the output voltage $V_{out}$. Therefore, the slope voltage generator 6a increases the slope angle of the slope voltage $V_s$ to have a larger slope angle than a slope angle of half the inductor current iL in a shut-down state in which the switching transistor M11 is turned off.

Figure 7:
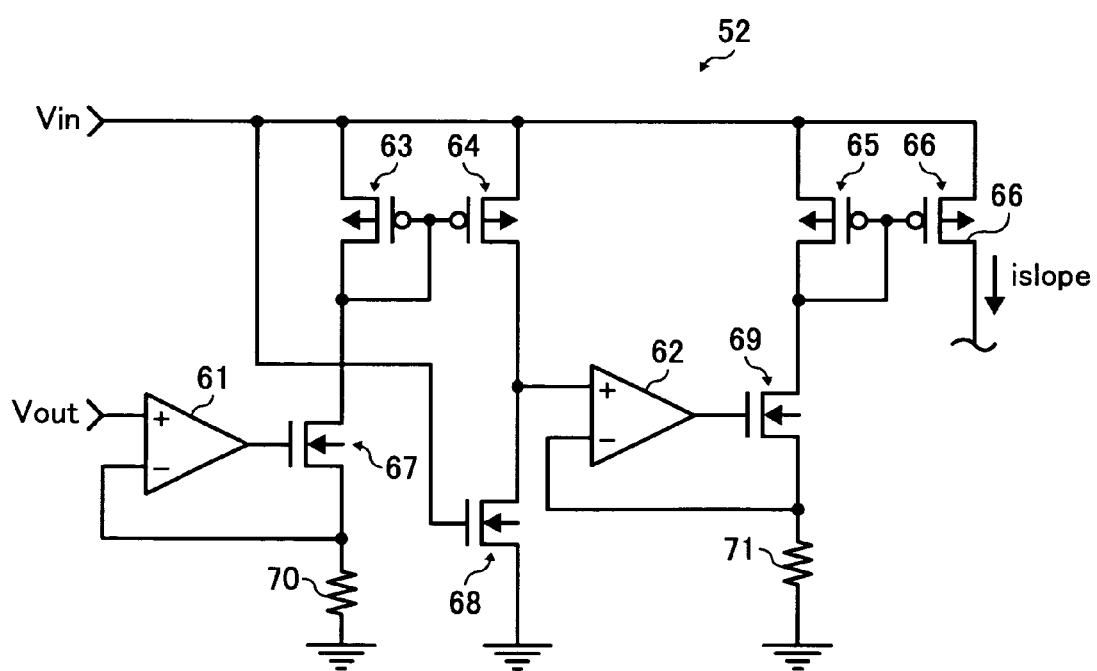
FIG. 7 is a diagram illustrating example circuitry of a voltage-to-current converter of FIG. 5.

FIG. 7 is a diagram illustrating example circuitry of the voltage-to-current converter 52.

In FIG. 7, the voltage-to-current converter 52 forms a current source that generates the current $i_{slope}$ corresponding to the output voltage $V_{out}$ and includes error amplifiers 61 and 62, PMOS transistors 63, 64, 65, and 66, NMOS transistors 67, 68, and 69, and resistors 70 and 71.

The PMOS transistors 63 and 64 form a current mirror circuit. The sources of the PMOS transistors 63 and 64 are connected to the input voltage $V_{in}$, the gates thereof are connected with each other, and the connection node thereof is connected to the drain of the PMOS transistor 63. The NMOS transistor 67 and the resistor 70 are connected in series between the drain of the PMOS transistor 63 and ground and the connection node thereof is connected the inverted input terminal of the error amplifier 61. In the error amplifier 61, a voltage equal to the output voltage $V_{out}$ is applied to the non-inverted input terminal and the output terminal is connected to the gate of the NMOS transistor 67. Although a voltage equal to the output voltage $V_{out}$ is applied to the non-inverted input terminal of the error amplifier 61, a description is given below of an example in which the output voltage $V_{out}$ is applied to the non-inverted input terminal of the error amplifier 61.

The NMOS transistor 68 is connected between the drain of the PMOS transistor 64 and ground. The input voltage $V_{in}$ is applied to the gate of the NMOS transistor 68.

The PMOS transistors 65 and 66 form a current mirror circuit. The sources of the PMOS transistors 65 and 66 are connected to the input voltage $V_{in}$, the gates thereof are connected to each other, and the connection node thereof is connected to the drain of the PMOS transistor 65. The NMOS transistor 69 and the resistor 71 are connected in series between the drain of the PMOS transistor 65 and ground and the connection node thereof is connected the inverted input terminal of the error amplifier 62. In the error amplifier 62, the non-inverted input terminal is connected to the connection node of the PMOS transistor 64 and the NMOS transistor 68 and the output terminal is connected to the gate of the NMOS transistor 69. The current $i_{slope}$ is output from the drain of the PMOS transistor 66.

In the above-described configuration, the error amplifier 61 controls the NMOS transistor 67 so that the same voltage is applied between its non-inverted input terminal and inverted input terminal. The resistors 70 and 71 are constant resistors with resistance values R70 and R71, respectively, neither of which fluctuates. The NMOS transistor 68 is formed by the same process as the switching transistor M11. The input voltage $V_{in}$ is applied to the gate of the NMOS transistor 68. The NMOS transistor 68 has the size of 1/n of the switching transistor M11 and the on-resistance of $R_{on} \times n$.

The output voltage $V_{out}$ is applied to the non-inverted input terminal of the error amplifier 61 and the voltage across the resistor 70 is equal to the output voltage $V_{out}$. Accordingly, the current of $V_{out}$/R70 flows through the resistor 70 and the NMOS transistor 68 via the current mirror circuit of the PMOS transistors 63 and 64. Therefore, the voltage across the NMOS transistor 68 is equal to $R_{on} \times n \times V_{out}$/R70. The error amplifier 62 controls the NMOS transistor 69 so that the voltage across the resistor 71 is equal to $R_{on} \times n \times V_{out}$/R70. Therefore, the current of $R_{on} \times n \times V_{out}$/R70/R71 flows through the resistor 71. The current $i_{slope}$ is expressed by the following formula (16):

$$i_{slope} = E \times R_{on} \times V_{out} \quad (16),$$

where E=n/R70/R71.

The current-mode controlled switching regulator according to the second embodiment provides an appropriate slope compensation in a wide input/output voltage range with simple circuitry by changing the slope angle of the slope voltage $V_s$ according to fluctuation in the output voltage $V_{out}$. Therefore, subharmonic oscillation can be avoided.

It should be noted that although the on-resistance of the switching transistor is used to convert a current into a voltage when the switching transistor is on in each of the above-described first and second embodiments, alternatively, a sense resistor may be connected in series to the inductor L1. In addition, the rectifying diode can be replaced by a synchronous rectification system using a synchronous rectification transistor that performs switching opposite to the switching of the switching transistor with the same effect.

As can be understood by those skilled in the art, numerous additional modifications and variations are possible in light of the above teachings. It is therefore to be understood that, within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program or computer program product. For example, the aforementioned methods may be embodied in the form of a system or device, including, but not limited to, any of the structures for performing the methodology illustrated in the drawings.

Example embodiments being thus described, it will be apparent that the same may be varied in many ways. Such variations are not to be regarded as a departure from the spirit and scope of the present invention, and all such modifications as would be obvious to one skilled in the art are intended to be included within the scope of the following claims.

What is claimed is:

1. A current-mode controlled step-down switching regulator comprising:
    an input terminal;
    an output terminal;
    a switching device configured to switch in accordance with a control signal;
    an inductor configured to store charge from an input voltage at the input terminal based on the switching device;
    a rectifying device configured to discharge the charge stored in the inductor;
    an error amplifier configured to amplify a voltage difference between a divided voltage generated by dividing an output voltage at the output terminal and a predetermined reference voltage;
    a slope voltage generator configured to generate and output a slope voltage having a slope angle corresponding to the input voltage; and
    a switching controller configured to compare a voltage output from the error amplifier with the slope voltage, generate a pulse signal with a duty cycle corresponding to a comparison result, and control the switching of the switching device according to the pulse signal.

2. The switching regulator according to claim 1, wherein the slope voltage generator increases the slope angle of the slope voltage to have a larger slope angle than a slope angle of half a current flowing through the inductor in a shut-down state in which the switching device is turned off.

3. The switching regulator according to claim 2, wherein the slope voltage generator comprises:
    a capacitor connected to the input terminal at a first end;
    a resistor connected to a second end of the capacitor at a first end of the resistor;
    a current source connected between a second end of the resistor and ground, and configured to supply current in accordance with the input voltage;
    a voltage supplier configured to apply a voltage output from the switching device to the second end of the capacitor for a predetermined time after the switching device is turned on; and
    a discharge circuit configured to discharge charge stored in the capacitor in the shut-down state in which the switching device is turned off,
    the slope voltage output from a connection node between the resistor and the current source.

4. The switching regulator according to claim 3, wherein the switching controller comprises:
    a voltage comparator configured to compare the voltage output from the error amplifier with the slope voltage and generate and output the pulse signal with the duty cycle corresponding to the comparison result;

an oscillator configured to generate and output a clock signal with a predetermined pulse width; and a control circuit configured to receive the clock signal from the oscillator to turn on the switching device, to receive the pulse signal from the voltage comparator to turn off the switching device, and to control the switching of the switching device according to the clock signal and the pulse signal, the voltage output from the switching device applied to the second end of the capacitor according to the clock signal from the oscillator.

5. The switching regulator according to claim 4, wherein the control circuit comprises a Reset-Set flip-flop circuit configured to receive the clock signal from the oscillator as a set signal, and to receive the pulse signal from the voltage comparator as a reset signal.

6. The switching regulator according to claim 1, wherein the error amplifier, the slope voltage generator, and the switching controller are integrated on an integrated circuit.

7. A current-mode controlled step-up switching regulator comprising:
an input terminal;
an output terminal;
a switching device configured to switch in accordance with a control signal;
an inductor configured to store charge from an input voltage at the input terminal based on the switching device;
a rectifying device configured to discharge the charge stored in the inductor;
an error amplifier configured to amplify a voltage difference between a divided voltage generated by dividing an output voltage at the output terminal and a predetermined reference voltage;
a slope voltage generator configured to generate and output a slope voltage having a slope angle corresponding to the output voltage; and
a switching controller configured to compare a voltage output from the error amplifier with the slope voltage, generate a pulse signal with a duty cycle corresponding to a comparison result, and control the switching of the switching device according to the pulse signal.

8. The switching regulator according to claim 7, wherein the slope voltage generator increases the slope angle of the slope voltage to have a larger slope angle than a slope angle of half a current flowing through the inductor in a shut-down state in which the switching device is turned off.

9. The switching regulator according to claim 8, wherein the slope voltage generator comprises:
a capacitor connected to ground at a first end;
a resistor connected to a second end of the capacitor at a first end of the resistor;
a current source connected between the input terminal and a second end of the resistor, and configured to supply current in accordance with the output voltage;
a voltage supplier configured to apply a voltage at a connection node of the inductor and the switching device to the capacitor for a predetermined time after the switching device is turned on; and
a discharge circuit configured to discharge charge stored in the capacitor in the shut-down state in which the switching device is turned off,
the slope voltage output from a connection node between the current source and the resistor.

10. The switching regulator according to claim 9, wherein the switching controller comprises:

a voltage comparator configured to compare the voltage output from the error amplifier with the slope voltage and generate and output the pulse signal with the duty cycle corresponding to the comparison result;

an oscillator configured to generate and output a clock signal with a predetermined pulse width; and a control circuit configured to receive the clock signal from the oscillator to turn on the switching device, to receive the pulse signal from the voltage comparator to turn off the switching device, and to control the switching of the switching device according to the clock signal and the pulse signal, the voltage at the connection node of the inductor and the switching device applied to the capacitor according to the clock signal from the oscillator.

11. The switching regulator according to claim 10, wherein the control circuit comprises a Reset-Set flip-flop circuit configured to receive the clock signal from the oscillator as a set signal, and to receive the pulse signal from the voltage comparator as a reset signal.

12. The switching regulator according to claim 7, wherein the error amplifier, the slope voltage generator, and the switching controller are integrated on an integrated circuit.

13. A control method for controlling a current-mode controlled step-down switching regulator comprising:
generating a slope voltage; and
changing a slope angle of the slope voltage according to an input voltage to generate a pulse signal for controlling switching of a switching device.

14. The control method according to claim 13, further comprising:
dividing an output voltage to generate a divided voltage;
amplifying a voltage difference between the divided voltage and a reference voltage;
comparing the amplified voltage difference with the slope voltage; and
generating a pulse signal with a duty cycle corresponding to a comparison result to control the switching of the switching device according to the pulse signal.

15. The control method according to claim 13, wherein the slope angle of the slope voltage is increased to have a larger slope angle than a slope angle of half a current flowing through an inductor in a shut-down state in which the switching device is turned off.

16. A control method for controlling a current-mode controlled step-up switching regulator comprising:
generating a slope voltage; and
changing a slope angle of the slope voltage according to an output voltage to generate a pulse signal for controlling switching of a switching device.

17. The control method according to claim 16, further comprising:
dividing the output voltage to generate a divided voltage;
amplifying a voltage difference between the divided voltage and a reference voltage;
comparing the amplified voltage difference with the slope voltage; and
generating a pulse signal with a duty cycle corresponding to a comparison result to control the switching of the switching device according to the pulse signal.

18. The control method according to claim 16, wherein the slope angle of the slope voltage is increased to have a larger slope angle than a slope angle of half a current flowing through an inductor in a shut-down state in which the switching device is turned off.

* * * * *